June 21, 1966   J. R. PUENTE   3,256,975
CONTAINER
Filed Nov. 29, 1963   2 Sheets-Sheet 1

INVENTOR.
JOSE R. PUENTE
BY
Cumpston & Shaw
HIS ATTORNEYS.

June 21, 1966  J. R. PUENTE  3,256,975
CONTAINER

Filed Nov. 29, 1963  2 Sheets-Sheet 2

INVENTOR.
JOSE R. PUENTE
BY
HIS ATTORNEYS.

United States Patent Office 3,256,975
Patented June 21, 1966

3,256,975
CONTAINER
Jose R. Puente, Rochester, N.Y., assignor to Leaming Industries, Inc., Canandaigua, N.Y., a corporation of New York
Filed Nov. 29, 1963, Ser. No. 326,711
2 Claims. (Cl. 206—46)

This invention relates to containers and particularly to covered containers. More particularly, the invention relates to a container and a cover for the container that are constructed to be suitable for particular applications such as, for example, the storage and shipment of fragile, highly valuable articles. More specifically, the invention is concerned with containers and container covers that can be fabricated by vacuum forming techniques from resilient, flexible, sheets of synthetic plastic materials.

There is a need for inexpensive yet practical, rugged, and durable containers for many purposes. For example, in recent years a growing market has evolved for preassembled printed wiring boards. Such a board may consist, for example, of a plastic board that has printed wiring on one or both surfaces thereof, and that has circuit components such as resistors, transistors, condensers and the like, mounted on one or both surfaces of the board. After such a board is fabricated it is frequently necessary to store it before it is used, particularly if the board is to be used as a spare or replacement part. Since these boards are susceptible to damage, and are small, irregularly shaped, and are highly valuable but may be relatively fragile, storage and shipment of these boards is often troublesome.

Glass plates that are coated with photosensitive emulsions provide a good example of another kind of article that is relatively fragile, valuable, and that is inconvenient and troublesome to handle, store, and ship.

One object of the present invention is to provide new, practical container structures that are suitable for the storage or shipment of unusual articles.

Another object of the invention is to provide new, practical containers and container covers.

Another object of the invention is to provide a new and practical container and container cover design that provides a good closure, that causes the assembled container and cover to resist accidental or unintentional separation, but that permits easy removal of and application of the cover to the container.

Another object of the invention is to provide a new covered container for the storage and shipment of fragile items.

A more specific object of the invention is to provide a practical covered container that is opaque and light-tight, for the shipment of photosenitive glass plates.

Another specific object of the invention is to provide a new and practical covered container for the storage and shipment of printed wiring boards and the like.

Another and more general object of the invention is to provide a new and practical covered container for the storage and shipment of valuable but fragile articles, in which the container structure guards its contents against physical shock.

A further object of the invention is to provide a covered container of the character described, that may be transparent if desired, to facilitate inspection of the contents of the container, or that may be opaque and light-tight, to protect the contents of the container from exposure to light.

Other objects of the invention will be apparent hereinafter from the specification and from the recital of the appended claims.

To these and other ends, the invention resides in certain arrangements and combinations of parts, all as will hereinafter be more fully described, the novel features being pointed out in the claims at the end of this specification.

In the drawings:

FIG. 1 is a perspective view of a container and its cover, that are assembled so that the container is closed, and that are constructed in accordance with one embodiment of this invention, to be suitable for the storage and shipment of printed circuit boards and the like;

FIG. 4 is a side elevation of a container and its cover, that are assembled so that the container is closed, and that are constructed in accordance with another embodiment of this invention, to be suitable for the storage and shipment of printed wiring boards and the like;

Figure 1:
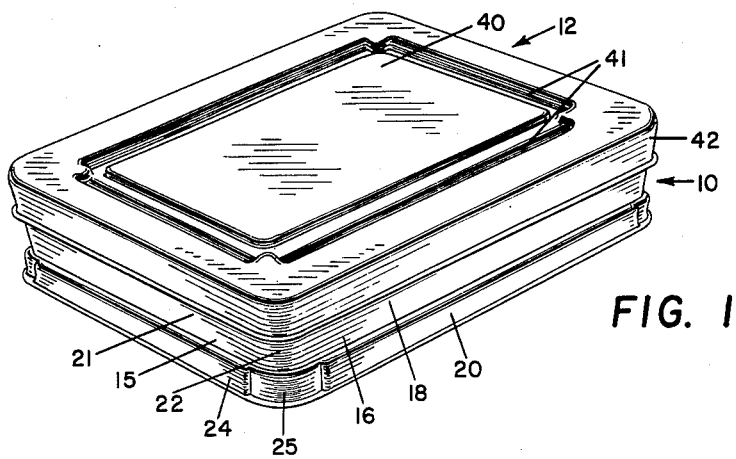
Figure 2:
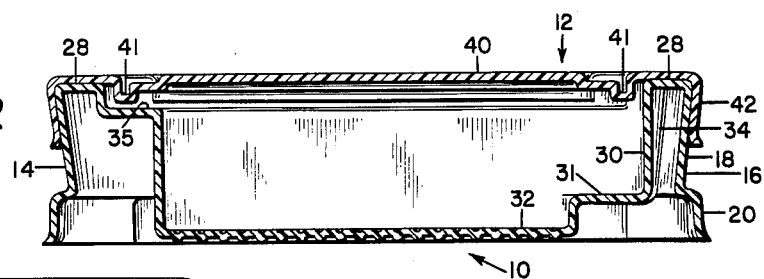
FIG. 2 is a transverse central section thereof, on an enlarged scale.
Figure 3:
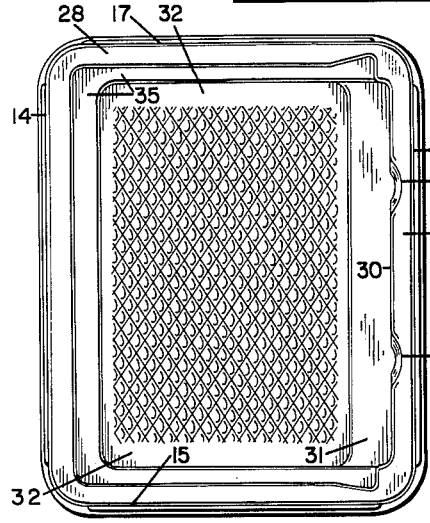
FIG. 3 is a top plan view of the container alone, with its cover removed.

Referring now in detail to the drawings by numerals of reference, and particularly to FIGS. 1, 2, and 3, the container 10 and its cover 12 are frabricated from a flexible, resilient synthetic plastic material, such as, for example, a medium density polyethylene, by vacuum forming.

The container 10 is formed with four outer side walls, 14, 15, 16, and 17 respectively. These side walls are generally similar in their structural profiles in a vertical plane. For example, referring particularly to FIG. 2, the outer side wall 16 is formed with an upper portion that is generally denoted by the numeral 18, and that is inclined outwardly from lower to upper levels thereof. The outer side wall 16 is also formed with a lower, outwardly flared, downwardly depending base flange 20 that is belled out from the container to extend slightly beyond the furthest outward extent of the upper portion 18 of the outer side wall. The base flange 20 of the outer side wall 16 extends over a major part of the length of the container.

At their corners, the four outer side walls are united with each other respectively through integral, rounded corner portions. Thus, the upper, outwardly inclined portions 21, 18, of the outer side walls 15, 16 respectively, are united by a rounded corner portion 22 that is also outwardly inclined from lower to upper levels thereof. The base flanges 24, 20, of the outer side walls 15, 16, respectively, are united through a rounded corner portion 25, that is flared outwardly from the upper rounded corner portion 22, but to a lesser extent than the base flanges, so that, in effect, the base flanges are discontinuous or "broken" at the corners of the container.

The container is formed with a lip 28 that extends continuously about the top of the container and that projects inwardly from the outer side walls respectively, to interconnect the outer side walls with the inner side walls. The inner side wall 30, at the front of the container, depends directly downwardly from the front portion of the lip 28, and is formed with an inwardly offset step 31. The lower end of the step 31 is integrally interconnected with the bottom panel 32 of the container. The front inner side wall 30 is also formed with a pair of upwardly extending recessed portions 34.

The other three inner side walls are formed with steps that provide ledge portions 35 adjacent the upper end of the container. These ledge portions have horizontal surfaces that are coplanar with each other and that are disposed in parallelism with the surface of the top lip 28.

The bottom panel 32 is integral with the side walls of the container. It is formed with a pattern of ridges that project downwardly from its lower surface to rigidify it and to permit it to have frictional engagement with a surface on which the container is placed.

The cover 12 for the container is formed with a top panel 40 in which a continuous, generally rectangular, depressed channel 41 is formed. The lower surface of the channel 41 is disposed to confront the surfaces of the ledge portions 35 of the container, when the cover is assembled on the container. The cover is also formed with a downwardly depending, continuous peripheral rim 42 that is formed with a negative draft, so that the rim seats snugly, in face-to-face engagement against the upper marginal portions of the outer side walls of the container, with an interference fit.

Containers constructed in accordance with this embodiment of the invention are particularly useful for the storage, handling and shipment of printed circuit boards on which electrical circuit components are mounted to project from one surface of the board. For example, a board of this type can be inserted in the container, with marginal portions of the board resting on the surfaces of the ledge portions 35, so that the board is supported along three sides within the container. The circuit components are disposed to project downwardly into the interior of the container, and preferably their dimensions are coordinated with those of the containers so that the electrical components have some clearance above the surface of the bottom of the container. When the cover is placed on the container, the bottom surface of the channel 41 engages against the surface of the board to clamp it firmly against the surfaces of the ledge portions 35. This prevents shifting of the wiring board within the covered container and suspends the components in spaced relation to the sides and bottom of the container, to protect them.

Since the cover fits on the container with an interference fit, the cover resists accidental separation from the container, but can be removed without difficulty when a lifting force is appiled. Removal of the cover is particularly facilitated when the lifting force is applied near a corner of the container.

When a printed circuit board is to be removed from the container, after removal of the cover, the recessed portions 34 in the inner front wall of the container facilitate the insertion of a tool, or of the fingers, under the front edge of the board, so that it can be lifted out more easily.

A container and cover that are made in accordance with this embodiment of the invention can be formed from either opaque, translucent, or transparent synthetic plastic materials. When a transparent material is employed for the fabrication of the container and its cover, visual inspection of the contents is feasible, and this increases the convenience of using the container and its cover.

Figure 4:
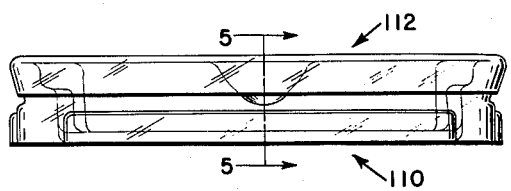
Figure 5:
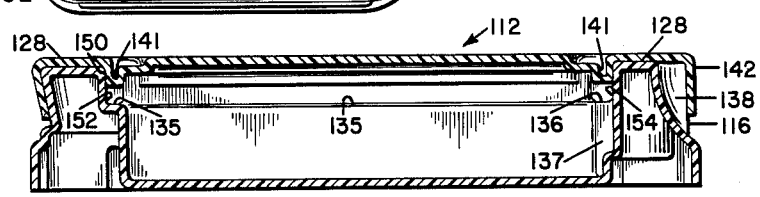
FIG. 5 is a section, on an enlarged scale, taken on the line 5—5 of FIG. 4, looking in a direction of the arrows.
Figure 6:
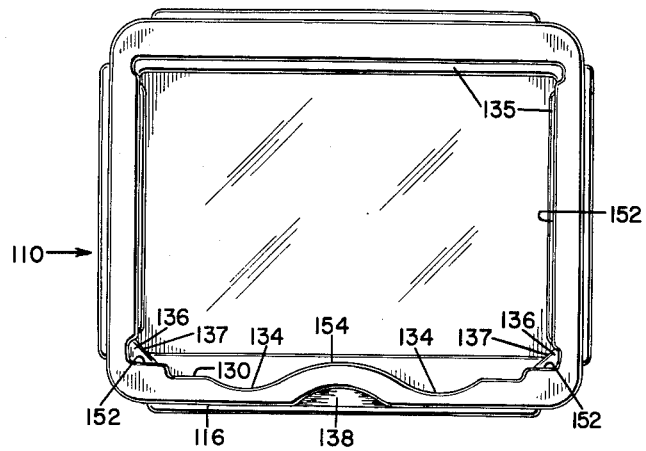
FIG. 6 is a top plan view of the container of FIGS. 4 and 5, with its cover removed.

In the modified embodiment of the invention that is illustrated in FIGS. 4, 5, and 6, the container 110 and its cover 112 are of somewhat modified construction. Thus, in the container 110, the ledge portions 135 are supplemented by triangular shaped ledges 136, at each side of the inner front wall 130 respectively. These ledges 136 are shoulders that are supported on webs 137 that unite the adjacent inner side walls of the container. The inner and outer side walls 130, 116, respectively, are modified in plan outline (FIG. 6) to provide deep, internal, vertically extending channels 134 inside the container, to facilitate the removal of a printed circuit board from the container, and to provide an external, vertically-extending recessed area 138 in the front outer side wall 116 of the container, that extends upwardly beneath the rim of the cover 112, to facilitate removal of the cover.

Moreover, the front outer side wall 116 is formed with an upper marginal portion that is essentially straight up and down, as is the cooperating portion of the rim 142 of the cover, only the other three sides of the container and cover being formed with the negative draft that serves to provide an interference fit, to retain the cover on the container.

The cover 112 is also formed with a channel 141 whose lower surface is disposed to confront the surfaces of the ledge portions 135, 136, and whose outer side surface 150 is disposed to engage against a portion of the shoulder 152 between the ledge portion 135 and the lip 128. Along the front of the box, the outer surface 150 of the channel engages against shoulder portions 152 at each side of the front inner wall, and as well, against a shoulder portion 154 at the center of the front inner wall.

In use of this container, a printed circuit board is clamped between the cover and the container as before. However, the cooperating action between the interference fit of the cover rim, along three sides of the container, and the engagement of the cover shoulders against the confronting shoulder surfaces of the container, strengthen and rigidify the entire structure, and tend to make removal of the cover sufficiently difficult to require a determined effort to remove it.

While containers and covers that are constructed in accordance with this invention are particularly useful for use with printed circuit wiring boards, as has been described, they are also useful for the storage and handling of small, relatively delicate articles, of which several may be placed loosely within a single container. For example, circuit components for electrical circuits of various types can be stored conveniently in containers made in accordance with this invention.

Containers may also be made in accordance with this invention for the storage and shipment of photosensitive glass plates. Thus, referring to FIGS. 7 and 8, the container's rear wall 214, bottom panel 232, and front wall 216 are fluted so as to provide, in effect, a plurality of separate three-sided grooves into each of which an individual glass plate can be inserted, to be held firmly in engagement with the surfaces bounding the groove, and in spaced relation relative to adjacent glass plates. The cover 240 may be formed with a channel 241, the lower surface of which may be disposed to engage against the edges of the glass plates, to hold them in place and to space them from the main part of the cover, better to protect them.

Figure 7:
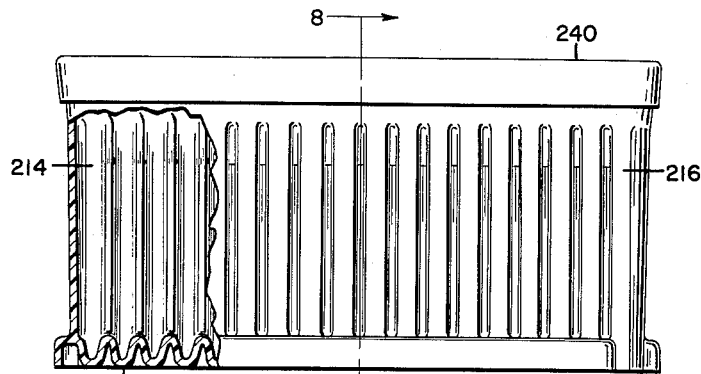
FIG. 7 is a side elevation, partly broken away, of a container and its cover, that are assembled so that the container is closed, and that are constructed in accordance with another embodiment of this invention, to be suitable for the storage and shipment of glass plates.
Figure 8:
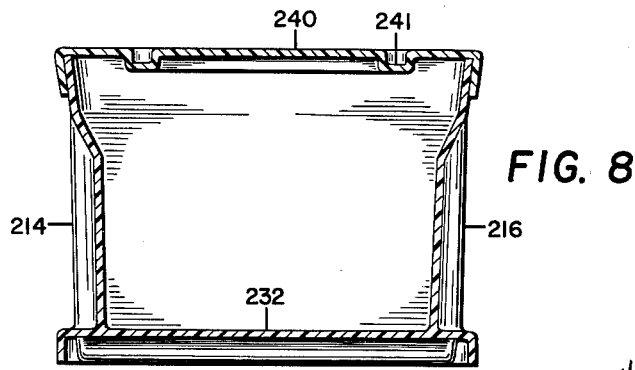
FIG. 8 is a section taken on the line 8—8 of FIG. 7, looking in the direction of the arrows.

In a container as illustrated in FIGS. 7 and 8, the sensitized, emulsion-coated surfaces of the plates are held out of contact with each other and other objects, to prevent damage to the delicate emulsion layers; and the container and its cover are formed from an opaque plastic material, so that the closed container is light-tight.

In each of the container constructions that are described in detail herein, the container structure is designed to protect the contents of the container and to insulate them from physical shock. The "broken" base flanges assist in this function since, if the container shown in FIG. 1 were dropped and landed on its rounded lower corner flange 25, a large part of the physical impact would be absorbed by flexing of the walls of the container, which would not be the case if the base flanges were not interrupted or "broken." The provision of outer walls that are spaced from the inner walls also imparts a cushioning, insulating effect.

While the cover preferably is former with an indented portion or channel that engages against the item or items in the container to prevent movement within the container, the channel can act to cushion the contents of the container even where it does not normally engage against them.

While the invention has been disclosed herein by reference to the details of preferred embodiments thereof, it is to be understood that this disclosure is intended in an illustrative, rather than in a limiting sense, and it is contemplated that various modifications in the construction and arrangement of the parts will readily occur to those skilled in the art, within the spirit of the invention and the scope of the appended claims.

I claim:
1. A container and cover, each of which is vacuum formed from a flexible sheet of resilient thermoplastic resin, said container being of substantially uniform thickness and comprising:
 (a) a bottom;
 (b) wall portions integral with said bottom and extending upward therefrom;
 (c) said wall portions being outwardly offset to provide a ledge around the periphery of said container, said ledge being spaced from said bottom to provide a chamber between said bottom and said element;
 (d) a generally plane and rigid printed circuit wiring board disposed on said ledge, said wiring board having components extending into said chamber;
 (e) said wall portions extending upward from said ledge and outward to form a co-planar upper edge of said container; and
 (f) said wall portions extending downward and inward from said upper edge portion to form a rim surrounding the upper periphery of said container; said cover being of substantially uniform thickness and comprising:
 (g) a generally flat top portion adapted to extend across the open top of said container;
 (h) a downwardly extending flange around the periphery of said cover adapted for closely engaging said downwardly extending wall portions of said container for an interference fit therewith; and
 (i) a downwardly extending channel spaced from the periphery of said cover and extending to adjacent said ledge when said cover is in place on said container for holding said element in a stored position on said ledge.

2. The combination of claim 1 including at least one zone of said wall portions that is formed to provide a recess below said ledge and extending outward and upward from said ledge whereby the edge of said element can be grasped to raise said element from said ledge.

References Cited by the Examiner
UNITED STATES PATENTS

| | | | |
|---|---|---|---|
| 2,998,158 | 8/1961 | Tupper | 150—0.5 |
| 3,101,864 | 8/1963 | Glickman | 220—60 |

FOREIGN PATENTS

| | | |
|---|---|---|
| 1,267,837 | 6/1961 | France. |
| 1,293,057 | 4/1962 | France. |
| 565,715 | 8/1957 | Italy. |

THERON E. CONDON, *Primary Examiner.*

W. T. DIXON, *Assistant Examiner.*